Patented Mar. 18, 1941

2,235,193

UNITED STATES PATENT OFFICE 2,235,193

PREPARATION OF PHENOLIC RESINS

Emil H. Balz, Toledo, Ohio, assignor to Plaskon Company, Incorporated, Toledo, Ohio, a corporation of Delaware No Drawing. Application July 27, 1938, Serial No. 221,607

4 Claims. (Cl. 260—57)

The invention relates to the preparation of phenolic resins, and more particularly to the removal of water from the initial reaction mass.

When formaldehyde reacts with a phenol, the reaction product is usually obtained in the form of an aqueous syrup. If the syrup is alkaline, a portion of the water can be caused to separate by adding an acid, but the remaining syrup contains a considerable proportion of water. It has not been possible heretofore to separate phenol-formaldehyde reaction products from the syrup obtained in the initial reaction except by distilling off the water. Because of the viscous nature of the syrup, the distilling of the water is a very slow and tedious process, and great care must be taken to prevent the reaction product from becoming overheated during the distillation. If overheating occurs, the reaction is likely to get out of control, so that the reaction mixture sets up into an inert, worthless mass.

The principal object of the invention is the separation of phenol-formaldehyde reaction products from the initial reaction mass by a simple precipitation step instead of the distillation step employed heretofore. More specific objects and advantages are apparent from the description, which merely discloses and illustrates the invention and is not intended to impose limitations upon the claims.

In accordance with the invention, the reaction product of formaldehyde and a phenol, such as a cresol, or phenol, is separated from the aqueous reaction mass in friable form by treating the mass with boric acid. If desired, an acid such as acetic acid may first be added to an alkaline aqueous reaction mass to separate part of the water. The resulting syrup or sticky mass may then be treated with borax, preferably in the form of an aqueous solution. The borax reacts with acetic acid to form boric acid, and the sticky mass quickly becomes chalky and friable.

If boric acid is added directly to an alkaline solution of a phenol-formaldehyde reaction product, the product precipitates in the form of a solid. The addition of any acid other than boric acid would cause the reaction product to separate in the form of an aqueous syrup. The friable solid reaction product prepared in accordance with the invention may be crushed, washed with water or dilute acid to free it from impurities, filtered and dried. The solid can be dried with ease.

A useful application of the invention is in the preparation of a molding powder. The initial aqueous solution of the phenol-formaldehyde reaction product can be used to impregnate a fibrous filler. The impregnated filler is then treated with boric acid, which causes the reaction product to become insoluble. Then the filler may be washed free of salts, dried, and made into a molding composition by grinding and incorporating modifiers in the usual manner.

Example 1

An alkaline solution of a phenol-formaldehyde reaction product is prepared by heating formaldehyde, a phenol, and any desired alkali together in aqueous solution in the usual manner. The quantity of acetic acid or other acid necessary to neutralize the resulting solution is determined by titrating a sample of the solution, and an aqueous solution is prepared containing the required quantity of acid together with 5 parts of borax for each 100 parts of the phenol-formaldehyde solution. The phenol-formaldehyde solution is then run into the acid solution so prepared. The phenol-formaldehyde reaction product then separates, not as a syrup, but as a friable solid. The solid is then filtered out of the solution, finely crushed, and washed first with dilute acetic acid and then with water. Drying is then carried out by exposing the solid to the atmosphere at room temperatures.

Example 2

An alkaline solution of the primary reaction product of phenol and formaldehyde is prepared in the usual manner, and paper pulp, wood flour, or other cellulosic material is stirred with the solution until it has been thoroughly impregnated. The quantity of cellulosic material should be sufficient to produce a thick slurry. The slurry is then mixed with a concentrated aqueous solution containing sufficient acetic acid to neutralize the slurry, together with 5 parts of borax for each 100 parts of the initial alkaline solution. The impregnated cellulosic material is then filtered from the slurry and washed with dilute acetic acid and then with water. After being dried at room temperatures, the impregnated cellulosic material is used in the preparation of molding compositions.

Various embodiments of the invention may be devised to meet various requirements.

Having described my invention, I claim:

1. A method of separating the reaction product of formaldehyde and a phenol from an aqueous reaction mass that comprises causing the reaction product to precipitate by bringing the mass together with boric acid, said boric acid being in solution, and then separating the water to form a friable solid.

2. A method of separating the reaction product of formaldehyde and a phenol from an alkaline aqueous reaction mass that comprises causing the reaction product to precipitate by bringing the mass together with acid material comprising boric acid, said boric acid being in solution, and then separating the water to form a friable solid.

3. A method of separating a phenol-formaldehyde reaction product from an alkaline aqueous reaction mass in friable form that comprises causing the reaction product to precipitate by bringing the mass together with acid material comprising boric acid, said boric acid being in solution, separating the water, washing the reaction product, and drying to form a friable solid.

4. A method of preparing a molding powder that comprises impregnating a fibrous filler with an aqueous syrup containing a phenol-formaldehyde reaction product, causing the reaction product to precipitate by bringing the impregnated filler together with boric acid, said boric acid being in solution, and washing.

EMIL H. BALZ.